F. McCarthy.
Cotton Cleaner.
Nº 3,912. Patented Feb. 12, 1845.
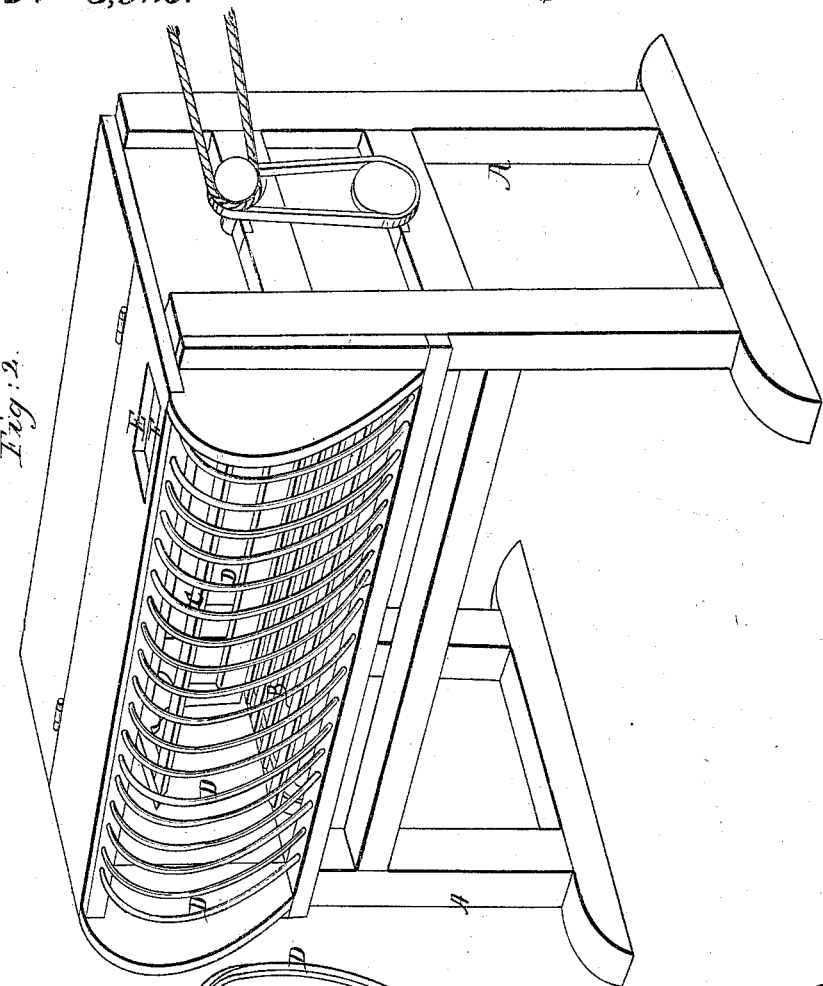
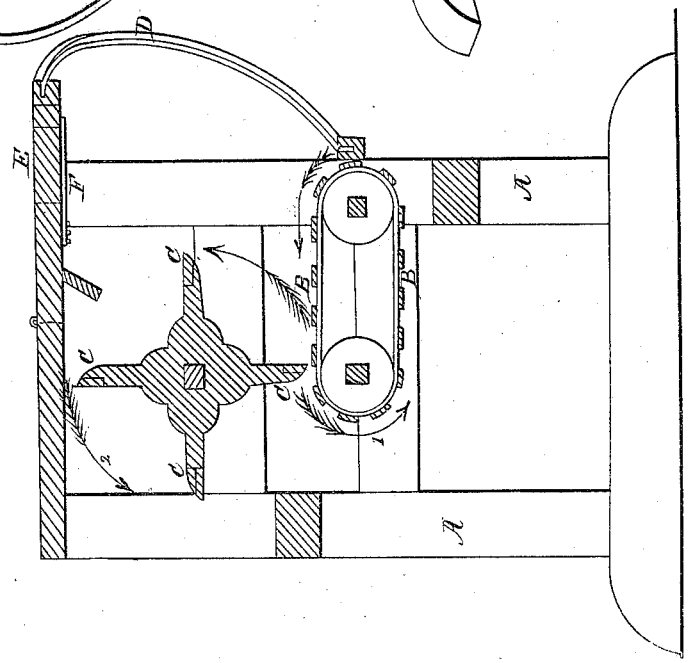

UNITED STATES PATENT OFFICE.

FONES McCARTHY, OF DEMOPOLIS, ALABAMA.

COTTON-CLEANER.

Specification of Letters Patent No. 3,912, dated February 12, 1845.

*To all whom it may concern:*

Be it known that I, FONES McCARTHY, of Demopolis, Marengo county, State of Alabama, have invented a new and useful Improvement in Machines for Cleaning Cotton, called "McCarthy's Endless Return Cotton-Whipper," which is described as follows, reference being had to the annexed drawings of the same, making part of this specification.

Figure 1 is a vertical longitudinal section at the center of the machine.

My improvement consists in combining and arranging in a suitable frame A an endless revolving chain of parallel slats B for returning the cotton, with a revolving reel of beaters C for whipping the cotton as it is successively returned to said beaters by the aforesaid revolving slats B; and a curved grating of parallel bars D against which the cotton is thrown by the centrifugal force of the revolving beaters; and by which curved grating the cotton is alternately conveyed to the endless conveyer B—the upper ends of the bars of the grating being inserted into the top of the frame, then bent outward from the frame and then inward toward it forming a semi-elliptical curve having the lower ends of said grate-bars inserted into a transverse girt of the frame near the periphery of one of the drums of the endless conveyer for directing the cotton, as it descends over the concave surfaces of the bars, to the endless conveyer, said semi-elliptical bars being arranged parallel to and at equal distances from each other next the end of the machine at which the cotton is introduced and at such distance as to form spaces for the escape of the dirt but not the cotton and extending in that manner to near the end of the machine at which the cotton is discharged, where the bars are placed wider apart forming a space for the discharge of the cotton. The material of which these bars are composed consists of smooth wire of the size numbered and each bar is bent at both ends and inserted securely into the said cross girts. An opening E is made in the top of the frame near one end thereof through which the uncleaned cotton is introduced to the whipper, covered by a flap valve F for preventing the escape of the cotton, kept closed by the current of air in the machine produced by the revolving of the beaters, and forced inward from over the opening, from the outside of the cotton by the introduction of the cotton. The bars or beaters of the revolving whipper are made like the paddles of a water wheel. The shaft extends horizontally and transversely through the frame and beyond it sufficiently far to receive a pulley for a band. The conveyer B is composed of a number of transverse parallel slats fastened to parallel endless straps or bands put around pulleys or drums turning on transverse parallel axles—one of which contains a pulley around which a band is passed for turning it. The conveyer turns in a direction from the grate toward the whipper or in the direction of the arrow No. 1. The whipper turns in a contrary direction as indicated by the arrow No. 2. The frame is made of any convenient size, shape, and material for the purpose intended. An inclined guard is inserted in the top of the frame to prevent the escape of the cotton over the top of the revolving whipper.

Operation: The machine being put in motion by any convenient power, the cotton is introduced at the opening E in the top and is struck by the revolving beaters C and thrown forward against the grating D through which the dirt is driven by the draft created by the motion of the beaters— the curved bars of the grating conduct the cotton thus partially cleaned to the endless revolving conveyer which conveys it back to the revolving beaters where it is again struck by them and driven against the grate bars in like manner gradually approaching the discharging end of the machine and in this manner the operation is repeated until the cotton reaches the discharging opening at which it passes out completely cleaned from the dirt which falls through between the bars of the conveyer and also passes out between the bars of the grate the cotton having undergone a thorough whipping and beating operation as it passes through the machine without tearing it to pieces or injuring the staple.

What I claim as my invention and which I desire to secure by Letters Patent is—

The combination of the revolving whipper with the endless conveyer arranged and operated in the manner and for the purpose set forth.

FONES McCARTHY.

Witnesses:
 EDWIN MAHER,
 JAMES GARDNER.